(12) United States Patent
Cielas

(10) Patent No.: US 12,413,573 B2
(45) Date of Patent: Sep. 9, 2025

(54) TIERED CERTIFICATE AUTHORITY SYSTEMS FOR BLOCKCHAIN SMART CONTRACTS ON BLOCKCHAIN CYBERSECURITY PLATFORMS

(71) Applicant: Halborn Inc., Miami, FL (US)

(72) Inventor: Piotr Wladyslaw Cielas, Poznan (PL)

(73) Assignee: Halborn Inc., Miami, FL (US)

( * ) Notice: Subject to any disclaimer, the term of this patent is extended or adjusted under 35 U.S.C. 154(b) by 122 days.

(21) Appl. No.: 18/451,616

(22) Filed: Aug. 17, 2023

(65) Prior Publication Data
US 2025/0062918 A1 Feb. 20, 2025

(30) Foreign Application Priority Data
Aug. 16, 2023 (PL) .......................................... 445826

(51) Int. Cl.
*H04L 9/40* (2022.01)
*H04L 9/00* (2022.01)
*H04L 9/32* (2006.01)

(52) U.S. Cl.
CPC ........ *H04L 63/0823* (2013.01); *H04L 9/3268* (2013.01); *H04L 9/50* (2022.05); *H04L 63/0884* (2013.01)

(58) Field of Classification Search
CPC ............. H04L 63/0823; H04L 63/0884; H04L 9/3268; H04L 9/3297; H04L 9/50
See application file for complete search history.

(56) References Cited

U.S. PATENT DOCUMENTS 10,547,457 B1  1/2020  Duccini
10,885,501 B2  1/2021  Uhr
(Continued)

FOREIGN PATENT DOCUMENTS

CN  110851813 A  2/2020
CN  115150071 A  10/2022
(Continued)

OTHER PUBLICATIONS

U.S. Appl. No. 18/451,631, filed Aug. 17, 2023, Piotr Wladyslaw Cielas.
(Continued)

*Primary Examiner* — Olugbenga O Idowu
(74) *Attorney, Agent, or Firm* — Baker Botts L.L.P.

(57) ABSTRACT

In one embodiment, a method includes identifying first entities by a first root authority entity, authorizing one or more first entities to be certificate authorities by the first root authority entity, wherein each certificate authority is configured to audit a smart contract in a development environment before it is deployed on a first blockchain network and authorized to issue a certificate for each smart contract audited in the development environment based on a determination that the corresponding smart contract deployed on the first blockchain network matches the smart contract that was audited in the development environment, determining certificate authority authorization parameters are not satisfied for at least a first certificate authority, and revoking the certificate authority authorization for the first certificate authority by the first root authority entity, wherein each certificate issued by the first certificate authority prior to the revocation remains valid after the revocation.

20 Claims, 8 Drawing Sheets

(56) References Cited

U.S. PATENT DOCUMENTS

| | | |
|---|---|---|
| 11,018,851 B2 | 5/2021 | Sarin |
| 11,288,736 B1 | 3/2022 | Jette et al. |
| 11,316,690 B2 | 4/2022 | Madisetti |
| 11,528,147 B2 | 12/2022 | Madisetti et al. |
| 12,210,637 B2 | 1/2025 | Valdez |
| 2019/0036711 A1 | 1/2019 | Qiu |
| 2019/0095909 A1 | 3/2019 | Wright |
| 2019/0172026 A1 | 6/2019 | Vessenes |
| 2019/0303920 A1 | 10/2019 | Balaraman |
| 2019/0305957 A1 | 10/2019 | Reddy |
| 2020/0104836 A1 | 4/2020 | Coburn et al. |
| 2020/0279257 A1* | 9/2020 | Cheng .................. H04L 9/3239 |
| 2021/0042749 A1 | 2/2021 | Cheng |
| 2022/0138733 A1 | 5/2022 | Madisetti et al. |
| 2022/0261882 A1 | 8/2022 | Youb |
| 2023/0214318 A1* | 7/2023 | Nallagonda ......... G06F 11/3696 717/124 |
| 2023/0252461 A1 | 8/2023 | Oh |
| 2024/0152888 A1 | 5/2024 | Minaei |
| 2024/0163097 A1 | 5/2024 | Dods |
| 2024/0356757 A1* | 10/2024 | Mitchell ............... H04L 9/3247 |
| 2025/0063036 A1 | 2/2025 | Cielas |
| 2025/0063037 A1 | 2/2025 | Cielas |
| 2025/0063038 A1 | 2/2025 | Cielas |

FOREIGN PATENT DOCUMENTS

| | | |
|---|---|---|
| CN | 119363356 A | 1/2025 |
| GB | 2583767 A | 11/2020 |
| WO | WO2022118263 A1 | 6/2022 |

OTHER PUBLICATIONS

U.S. Appl. No. 18/451,638, filed Aug. 17, 2023, Piotr Wladyslaw Cielas.

U.S. Appl. No. 18/451,642, filed Aug. 17, 2023, Piotr Wladyslaw Cielas.

* cited by examiner

100

110 — Identify, by a first root authority entity of one or more root authority entities associated with the blockchain cybersecurity platform, a plurality of first entities associated with the one or more root authority entities, wherein the first root authority entity is the blockchain cybersecurity platform, and wherein the first root authority entity is associated with an account address storing one or more of an authority wallet address or a number of certificate authorities 120 — Authorize, by the first root authority entity, from the plurality of first entities, one or more first entities to be certificate authorities, wherein each certificate authority is configured to audit a smart contract in a development environment before the smart contract is deployed on a first blockchain network, and wherein each certificate authority is authorized to issue, for each smart contract audited by the certificate authority in the development environment, a certificate for the smart contract based on a determination that the corresponding smart contract deployed on the first blockchain network matches the smart contract that was audited in the development environment, wherein the one or more certificate authorities are authorized to issue and reissue certificates in the development environment, wherein each issued certificate comprises data associated with the first root authority entity that issued the certificate, wherein each issued certificate is written to the first blockchain network, wherein each issued certificate comprises data configured for public queries, and wherein each issued certificate comprises one or more of an identifier associated with the corresponding smart contract, a hash associated with the corresponding smart contract, a size associated with the corresponding smart contract, a time slot at which the certificate was issued, a status of the certificate, an upgrade authority for the corresponding smart contract, a certificate edition, an address of an account that stores additional data about a certified program or an audit report associated with the corresponding smart contract, or an account address associated with the first root authority entity 130 — Determine, by the first root authority entity, for at least a first certificate authority authorized by the first root authority entity, that one or more certificate authority authorization parameters are not satisfied, wherein determining that the certificate authority authorization parameters are not satisfied for the first certificate authority is based on one or more of an automatic recurring validation process associated with one or more of the certificate authorities, an automatic determination that a value for at least one of the certificate authority authorization parameters exceeds a threshold value, receiving, from an external entity associated with the first smart contract, a request to revoke the certificate authority authorization for the first certificate authority, a recurring validation process associated with one or more of the certificate authorities conducted by one or more second entities associated with the first root authority entity, a specified period of time associated with a number of certificates issued by the first certificate authority when the one or more certificate authority authorization parameters for the first certificate authority comprise the number of certificates issued by the first certificate authority, a determination that a status of the association between the first root authority entity and the first certificate authority is invalid when the one or more certificate authority authorization parameters for the first certificate authority comprise the status of the association between the first root authority entity and the first certificate authority, or a determination that a threshold time has elapsed since an authorization time when the one or more certificate authority authorization parameters for the first certificate authority comprise the authorization time indicating when the first certificate authority was authorized to be a certificate authority 140 — Revoke, by the first root authority entity, the certificate authority authorization for the first certificate authority, wherein each certificate issued by the first certificate authority prior to the revocation remains valid after the revocation of the certificate authority authorization

*FIG. 1*

TIERED CERTIFICATE AUTHORITY SYSTEMS FOR BLOCKCHAIN SMART CONTRACTS ON BLOCKCHAIN CYBERSECURITY PLATFORMS

PRIORITY

This application claims the benefit of Polish Patent Application No. PL445826, filed 16 Aug. 2023, which is incorporated herein by reference.

TECHNICAL FIELD

This disclosure generally relates to databases and file management within blockchain network environments, and in particular relates to hardware and software for auditing and certificating smart contracts within a blockchain network environment.

BACKGROUND

A blockchain is a type of digital ledger technology (DLT) that consists of a growing list of records, called blocks, that are securely linked together using cryptography. Each block contains a cryptographic hash of the previous block, a timestamp, and transaction data (generally represented as a Merkle tree, where data nodes are represented by leaves). The timestamp proves that the transaction data existed when the block was created. Since each block contains information about the block previous to it, they effectively form a chain (compare linked list data structure), with each additional block linking to the ones before it. Consequently, blockchain transactions are irreversible in that, once they are recorded, the data in any given block cannot be altered retroactively without altering all subsequent blocks.

A smart contract is a computer program that is stored on the blockchain and that is executed by the blockchain when certain conditions are met. For example, a smart contract can be used to automate the payment of a product that is delivered by a shipper to a customer. A smart contract is created with a transaction that uploads the code of a contract at a preselected or pseudo-random address on the blockchain but unless restricted programmatically by the smart contract author, everybody can execute it. A smart contract is executed by invoking transactions to the contract address (also referred to herein as a "program address" or "smart contract address"). The transaction is the invocation of a function of the smart contract. The function is a part of the implementation of the smart contract. The smart contract is a state machine. A state machine is a mathematical model that describes the behavior of a system. In a state machine, the system transitions from one state to another when an event occurs and a condition is met. In a smart contract, the event is the invocation of a function of the smart contract, and the condition is defined in the function that is invoked.

SUMMARY OF PARTICULAR EMBODIMENTS

In particular embodiments, the blockchain cybersecurity platform may use a program audit certificate system to improve the review process of programs (e.g., smart contracts). Program developers may agree with the certificate authorities on a shared development environment for the purposes of deployment and certification. With a dedicated certificate system, certificate authorities may issue certificates for arbitrary programs, thus verifying and confirming that the deployed versions match the reviewed versions. In particular embodiments, a certificate may be linked in a cryptographically secure way to the program it was issued for and the issuing entity. Once issued, certificates cannot be tampered with. A root certificate authority (also referred to herein as "root authority," "root authority entity," or "RCA") may revoke its child certificates if it determines they were issued by a rogue certificate authority. Certificates may expire automatically when the programs the certificates were issued for are updated. Program certificate verification may be simple and cheap, and may require the verifier to provide just the program address and the address of a root certificate authority. The certificate system may support multiple issuing entities and certificate reissuing functionality in case developers require independent reviews or recertification of their programs. Although this disclosure describes certificating particular programs by particular systems in a particular manner, this disclosure contemplates certificating any suitable program by any suitable system in any suitable manner.

In particular embodiments, a blockchain cybersecurity platform may utilize tiered certificate authority systems to issue certificates for blockchain smart contracts. The blockchain cybersecurity platform may authorize one or more root authority entities (multiple root certificate authorities may coexist in the platform, and each can authorize an arbitrary number of certificate authorities), which in turn may create certificate authorities authorized to issue certificates. Based on the setup of a development environment agreed by both users (e.g., a person or an entity involved with developing the blockchain smart contract) and certificate authorities, the certificate authorities may audit smart contracts and issue certificates accordingly. In particular embodiments, every root certificate authority can revoke certificate authorities it created and the certificates its certificate authorities issued. A root authority entity may have the ability to both manually and automatically revoke certificates and certificate authorities. Although this disclosure describes using particular certificate authority systems to issue particular certificates in a particular manner, this disclosure contemplates using any suitable certificate authority system to issue any suitable certificate in any suitable manner.

In particular embodiments, the blockchain cybersecurity platform may identify, by a first root authority entity of one or more root authority entities associated with the blockchain cybersecurity platform, a plurality of first entities associated with the one or more root authority entities. In particular embodiments, the blockchain cybersecurity platform may authorize, by the first root authority entity, from the plurality of first entities, one or more first entities to be certificate authorities. Each certificate authority may be configured to audit a smart contract in a development environment before the smart contract is deployed on a first blockchain network. Each certificate authority may be authorized to issue, for each smart contract audited by the certificate authority in the development environment, a certificate for the smart contract based on a determination that the corresponding smart contract deployed on the first blockchain network matches the smart contract that was audited in the development environment. In particular embodiments, the blockchain cybersecurity platform may then determine, by the first root authority entity, for at least a first certificate authority authorized by the first root authority entity, that one or more certificate authority authorization parameters are not satisfied. The blockchain cybersecurity platform may further revoke, by the first root authority entity, the certificate authority authorization for the first certificate authority. In particular embodiments, each certificate issued by the first certificate authority prior to the revocation may remain valid after the revocation of the certificate authority authorization.

Certain technical challenges exist for tiered certificate authority systems. One technical challenge may include effectively maintaining the certification authority authorization of a certificate authority by a root authority entity. The solution presented by the embodiments disclosed herein to address this challenge may be revoking the certification authority authorization upon determining that certificate authority authorization parameters for the certificate authority are not satisfied as these parameters evaluate different perspectives of the certificate authority being suitable for issuing certificates for smart contracts.

Certain embodiments disclosed herein may provide one or more technical advantages for tiered certificate authority systems. A technical advantage of the embodiments may include improved security for certifying smart contracts as a certificate authority may only issue and reissue certificates in the certificate system where it is authorized by the root authority entity. Certain embodiments disclosed herein may provide none, some, or all of the above technical advantages. One or more other technical advantages may be readily apparent to one skilled in the art in view of the figures, descriptions, and claims of the present disclosure.

In particular embodiments, the blockchain cybersecurity platform may issue certificates for deployed blockchain smart contracts upon completing the audit successfully. The blockchain cybersecurity platform may issue certificates in the context of the following auditing process, including certificate authorities receiving a copy of the smart contract source code, certificate authorities sharing the audit results with the development team, development team addressing all findings, certificate authorities reviewing the changes the development team made, certificate authorities and the development team publishing the audit report, after which the smart contract may be deployed on the network. Although this disclosure describes issuing particular certificates based on particular auditing processes in a particular manner, this disclosure contemplates issuing any suitable certificate based on any suitable auditing process in any suitable manner.

In particular embodiments, the blockchain cybersecurity platform may receive, by a certificate authority, authorization to access a specified development environment associated with a smart contract. The blockchain cybersecurity platform may then receive, by the certificate authority, in the development environment, a first copy of source code associated with the smart contract. In particular embodiments, the certificate authority may be authorized to audit the smart contract. The blockchain cybersecurity platform may then generate, by the certificate authority, an audit report for the smart contract based on the first copy of source code and one or more security criteria. In particular embodiments, the blockchain cybersecurity platform may further receive, by the certificate authority, in the development environment, a second copy of source code associated with the smart contract. The second copy of source code may be generated responsive to the audit report. In particular embodiments, the blockchain cybersecurity platform may then determine, by the certificate authority, that the second copy of source code satisfies the one or more security criteria. The blockchain cybersecurity platform may then receive, by the certificate authority, an indication that the smart contract was deployed on a first blockchain network. In particular embodiments, the blockchain cybersecurity platform may determine, by the certificate authority, that the smart contract deployed on the first blockchain network matches the second copy of source code in the development environment. The blockchain cybersecurity platform may further issue, by the certificate authority, a certificate for the smart contract based on the determination that the smart contract deployed on the first blockchain network matches the second copy of source code.

Certain technical challenges exist for post-audit certificate issuance. One technical challenge may include determining a deployed smart contract matches its audited copy. The solution presented by the embodiments disclosed herein to address this challenge may be determining if the deployed smart contract matches its audited copy based on the hash and/or timestamp associated with the smart contract, as the hash and/or timestamp may indicate whether there is any change between the deployed smart contract matches its audited copy.

Certain embodiments disclosed herein may provide one or more technical advantages for post-audit certificate issuance. A technical advantage of the embodiments may include preventing or mitigating security risks for smart contracts as the certificate authorities may test and review the source code, research the technology and find bugs and vulnerabilities in smart contracts before they are deployed to the blockchain networks. Certain embodiments disclosed herein may provide none, some, or all of the above technical advantages. One or more other technical advantages may be readily apparent to one skilled in the art in view of the figures, descriptions, and claims of the present disclosure.

In particular embodiments, the blockchain cybersecurity platform may perform on-chain certificate verification for interrelated blockchain smart contracts. Upon receiving a verification request for a certificate, the blockchain cybersecurity platform may determine whether a certificate account exists for a pair of a smart contract address and a root authority entity address, determine whether the smart contract is upgradeable, and determine whether the smart contract was modified after the certificate was issued. In particular embodiments, a first blockchain program may verify the certificate for a second blockchain program. Although this disclosure describes verifying particular certificates by particular systems in a particular manner, this disclosure contemplates verifying any suitable certificate by any suitable system in any suitable manner.

In particular embodiments, the blockchain cybersecurity platform may send, by a first smart contract deployed on a first blockchain network by a first entity, a verification request for a certificate issued by a certificate authority. The certificate may be associated with a second smart contract. In particular embodiments, the verification request may comprise a program address associated with the second smart contract and an address associated with a first root authority entity associated with the certificate authority. In particular embodiments, the blockchain cybersecurity platform may receive, by the first smart contract, a verification response indicating that the second smart contract is associated with a certificate matching the program address associated with the second smart contract and the address associated with the first root authority entity in the verification request. The blockchain cybersecurity platform may then determine, by the first smart contract, whether the second smart contract is an upgradeable smart contract. In particular embodiments, the blockchain cybersecurity platform may further determine, by the first smart contract, whether the certificate is valid based on a determination of whether the second smart contract was modified after the certificate was issued.

Certain technical challenges exist for certificate verification for smart contracts. One technical challenge may include efficiently and effectively verifying the certificate for a smart contract. The solution presented by the embodiments disclosed herein to address this challenge may be determining whether a certificate account exists for a pair of the program address and the root authority entity address, whether said certificate is revoked and determining whether the smart contract was modified after the certificate account was created as the system may have high confidence that the certificate is invalid if the certificate account does not exist, it is revoked or the smart contract was modified after the certificate account was created.

Certain embodiments disclosed herein may provide one or more technical advantages for certificate verification for smart contracts. A technical advantage of the embodiments may include improved user confidence as after the user verifies a certificate, the user may determine that it is secure to execute the program associated with the certificate as one or more certificate authorities have already verified the program. Certain embodiments disclosed herein may provide none, some, or all of the above technical advantages. One or more other technical advantages may be readily apparent to one skilled in the art in view of the figures, descriptions, and claims of the present disclosure.

In particular embodiments, the blockchain cybersecurity platform may reissue certificates for upgraded blockchain smart contracts or when the original certificates were revoked. Compared to the initial certificate issuance, the blockchain cybersecurity platform may perform additional decisional checks for upgradeable smart contracts, including the initial check for whether the program is upgradeable, and the subsequent determination of whether the program has actually been upgraded based on, for example, temporal comparisons between the existing certificate's issuance and the most recent deployment of the program, or whether the original certificate was revoked. Although this disclosure describes reissuing particular certificates based on particular auditing processes in a particular manner, this disclosure contemplates reissuing any suitable certificate based on any suitable auditing process in any suitable manner.

In particular embodiments, the blockchain cybersecurity platform may receive, by a certificate authority, a request to reissue a certificate for a smart contract on a first blockchain network. In particular embodiments, an original certificate may be previously issued for the smart contract. The blockchain cybersecurity platform may then determine, by the certificate authority, that the smart contract is an upgradeable smart contract and that the smart contract was modified after the original certificate was issued, or that the original certificate was revoked. In particular embodiments, the blockchain cybersecurity platform may receive, by the certificate authority, in a development environment, a copy of updated source code associated with an updated version of the smart contract. The blockchain cybersecurity platform may then determine, by the certificate authority, whether the copy of updated source code satisfies one or more security criteria. In particular embodiments, the blockchain cybersecurity platform may receive, by the certificate authority, an indication that the updated smart contract was deployed on the first blockchain network. The blockchain cybersecurity platform may then determine, by the certificate authority, that the updated smart contract deployed on the first blockchain network matches the copy of updated source code in the development environment. The blockchain cybersecurity platform may further issue, by the certificate authority, a reissue certificate for the updated smart contract based on the determination that the updated smart contract deployed on the first blockchain network matches the updated source code.

Certain technical challenges exist for certificate reissuance for smart contracts. One technical challenge may include determining that a certificate should be reissued for a smart contract. The solution presented by the embodiments disclosed herein to address this challenge may be determining whether the original certificate was revoked, or whether the smart contract is upgradeable and whether it was modified after a certificate was issued for the smart contract, as an upgradeable contract may be modified, and a modification to the smart contract may make it necessary for the certificate to be reissued.

Certain embodiments disclosed herein may provide one or more technical advantages for certificate reissuance for smart contracts. A technical advantage of the embodiments may include consistently efficient certification processes as the certificate authority may easily re-audit the smart contract in the development environment familiar to both the user and certificate authorities and re-issue a certificate to the smart contract upon successfully completing the audit following the same criteria. Certain embodiments disclosed herein may provide none, some, or all of the above technical advantages. One or more other technical advantages may be readily apparent to one skilled in the art in view of the figures, descriptions, and claims of the present disclosure.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 1 illustrates an example method for implementing tiered certificate authority systems.

DESCRIPTION OF EXAMPLE EMBODIMENTS

Figure 2:
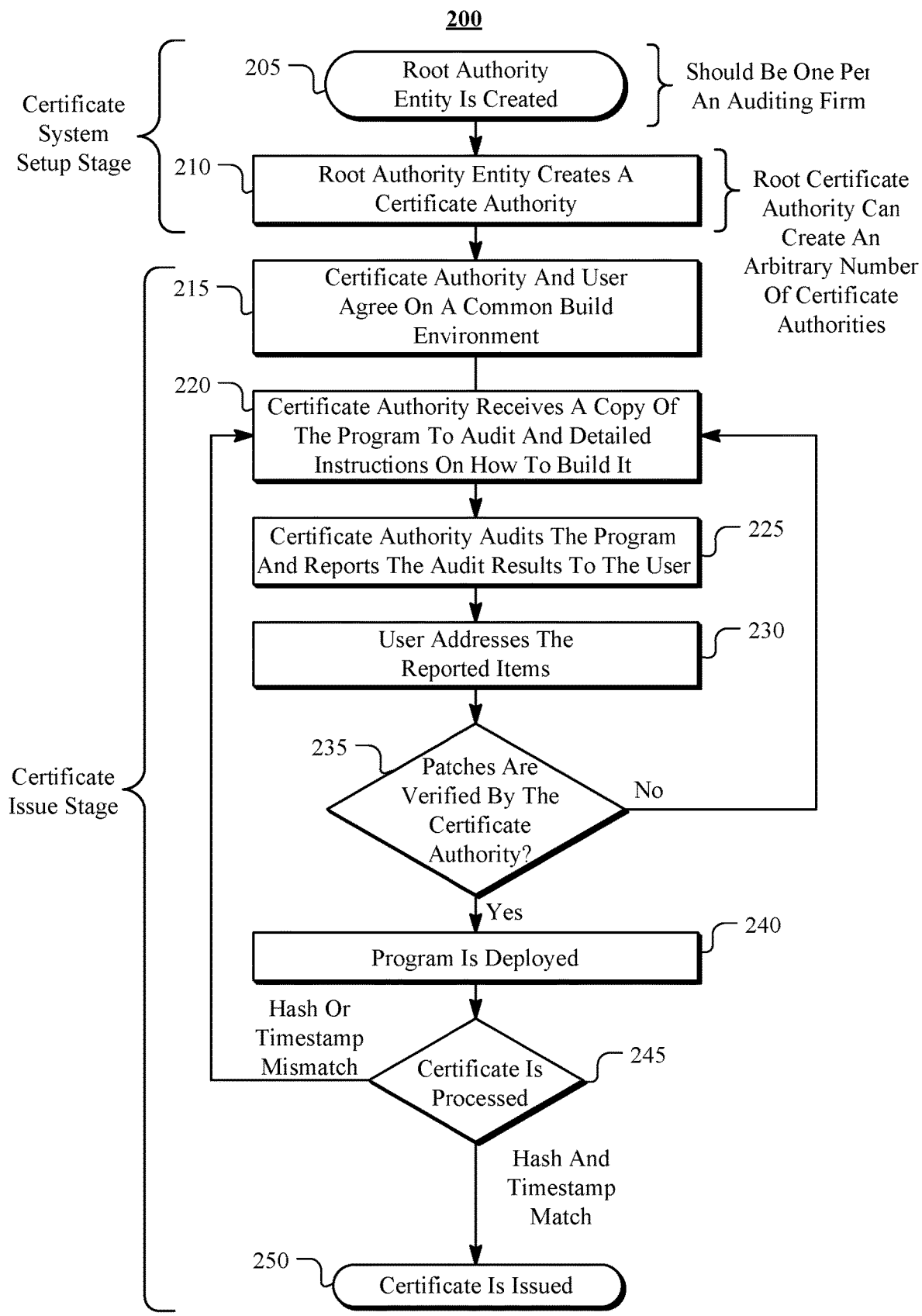
FIG. 2 illustrates an example flow diagram for issuing a certificate.

Certificate Authority Systems for Blockchain Smart Contracts on Blockchain Cybersecurity Platforms In particular embodiments, the blockchain cybersecurity platform may use a program audit certificate system to improve the review process of programs (e.g., smart contracts). Program developers may agree with the certificate authorities on a shared development environment for the purposes of deployment and certification. With a dedicated certificate system, certificate authorities may issue certificates for arbitrary programs, thus verifying and confirming the deployed versions match the reviewed versions. In particular embodiments, a certificate may be linked in a cryptographically secure way to the program it was issued for and the issuing entity. Once issued, certificates cannot be tampered with. A root certificate authority (also referred to herein as "root authority," "root authority entity," or "RCA") may revoke its child certificates if it determines they were issued by a rogue certificate authority. Certificates may expire automatically when the programs the certificates were issued for are updated. Program certificate verification may be simple and cheap, and may require the verifier to provide just the program address and the address of a root certificate authority. The certificate system may support multiple issuing entities and certificate reissuing functionality in case developers require independent reviews or recertification of their programs. Although this disclosure describes certificating particular programs by particular systems in a particular manner, this disclosure contemplates certificating any suitable program by any suitable system in any suitable manner.

In particular embodiments, a blockchain network may serve as a smart contract platform. The blockchain network may have a contract upgrade feature that allows developers to evolve and adapt their programs. However, the blockchain networks may face security risks such as breaches and hacks. To prevent those situations or mitigate the risk of them ever happening, cybersecurity companies may test and review the source code, research the technology and find bugs and vulnerabilities in smart contracts before they are deployed to the blockchain networks. Web3 companies may then patch their programs before they are released, promising their users security of their assets. All software may be constantly evolving, and smart contracts may be no exception. Users may have to trust the web3 companies that they launch the exact same version of their programs they gave the auditors to review, adding a trust component to the process.

The embodiments disclosed herein introduce a program-based solution to this issue on the blockchain networks. The embodiments disclosed herein may remove the trust component with on-chain audit certificates.

In particular embodiments, smart contracts in blockchain networks may be seen as programs. As an example and not by way of limitation, they may be written in C or Rust and compiled to an executable and linkable format (ELF) object containing a variation of Berkley Packet Filter (BPF) bytecode. The programs may be processed by an isolated BPF virtual machine on the blockchain. The BPF instruction set may be originally designed to work in a virtual machine in the Linux kernel, accessing network traffic by the use of multiple system calls. In particular embodiments, ELF may be a common standard file format for multiple file types, including executables and shared libraries. Each ELF file may be made of one program header table, one section header table and data referred to by the entries in the program and section header tables. Depending on how it is referred to, the data may be processed or read from. Specifically, there may be sections holding executable bytecode, sections holding read-only data and sections describing how the executable should be linked in a shared environment. In particular embodiments, a BPF virtual machine may not need all available ELF sections to execute the binary. As an example and not by way of limitation, the required sections may comprise PROGBITS sections, the dynamic symbol table and the dynamic symbol name table.

In particular embodiments, programs may be stored in accounts. Account state may be described with an account-information struct which holds account metadata and custom user data. As an example and not by way of limitation, the account-information struct may be as follows.

```
pub struct AccountInfo<'a>{
    pub key: &'a Pubkey,
    pub is_signer: bool,
    pub is_writable: bool,
    pub lamports: Rc<RefCell<&'a mut u64>>,
    pub data: Rc<RefCell<&'a mut [u8]>>,
    pub owner: &'a Pubkey,
    pub executable: bool,
    pub rent_epoch: Epoch,
}
```

If executable is true, it may indicate that the account stores data required to execute a BPF binary. In particular embodiments, maximum program size may be restricted to a global account size limit, e.g., 10 MB.

In particular embodiments, developers may opt in to make their programs upgradeable. As an example and not by way of limitation, the ways to enable smart contract updates may comprise the proxy pattern in Ethereum or migrations in CosmWasm. When an immutable program is deployed at some address in a blockchain network, the executable field in its account may be set to true, the data field may store the program bytecode and the BPF loader native program may be assigned ownership of the account. Such program may not be modified. When an upgradeable program is deployed at some address in the blockchain network, the account at this address may be also marked executable, but the upgradeable BPF loader native program may be assigned ownership of this account and the data field may store the address of the program-data account. It may be the program-data account that stores the program bytecode. The bytecode may be prefixed with a struct holding the number of the slot at which the program was most recently modified, and the address of the account authorized to update the program. Because on code update the program address may not change, the upgrade may be transparent for end users.

In a centralized system, multiple layers may stand between users and the transaction settling logic. For particularly sensitive or critical actions, human operators may verify the transactions and require confirmations and proofs from the involved users. This may be because users delegated the ownership of their assets to a third party and they authorized it to perform actions on their behalf. On a basic level, the users may have no control over what happens with their assets up to the point where the trusted third party may make an arbitrary decision to reject a transaction or deny access to the assets altogether. Smart contracts may take a different path. Users may retain full custody of their assets and there may be no middlemen processing the transactions.

Theoretically, the multi-tiered architecture of centralized systems may make the smart contracts more difficult to hack as the attackers often need to penetrate the entire infrastructure to get access to the protected assets. However, in reality, although blockchain guarantees mathematically proven security, assets on blockchain may be only as secure as the security measures implemented by smart contract developers. This may underscore the important role blockchain cybersecurity platforms play in the blockchain and web3 space. Source code review and dynamic testing should be an integral part of software development life cycle. Although no auditor may ever guarantee (nor should it be realistically expected from them) 100% of bugs can be caught in a single review, ideally no smart contract should ever be interacted with if it has not been audited by an expert before released to the blockchain network.

In particular embodiments, the auditing process may comprise the following high-level steps. In a first step, auditors may receive a copy of the smart contract source code. In a second step, the auditors may share the audit results with the development team. In a third step, the development team may address all findings. In a fourth step, the auditors may review the changes the development team made. In a fifth step, the auditors and the development team may publish the audit report. In a sixth step, the smart contract may be deployed on the blockchain network. Intuitively, one may expect the code deployed in the fifth step is the exact same version the auditors received in the fourth step. Verifying that, however, may require advanced tech skills which most users may not have. On top of that, if a smart contract is upgradeable, the development team may be free to update it at their convenience. The users may have no way of verifying they are interacting with the version of the contract the auditing entity received and reviewed. If a smart contract is compromised, the auditors may find themselves in an uncomfortable position if the smart contract deployed turns out not to be what was in scope of the audit.

As a solution to the aforementioned problems on the blockchain network, a blockchain cybersecurity platform as disclosed herein may issue on-chain audit certificates for smart contracts.

In particular embodiments, on-chain objects may be verifiable on-chain. Verification results may be unambiguous and, much like with elliptic curve signatures, the cost of verification may be negligible compared to the cost of creating the proof. The proof may not be forged or tampered with, and it may automatically expire if certain conditions are met. Proof issuers may be easy to identify. Proof issuers and proofs may be scalable. In particular embodiments, a smart contract may satisfy all the above requirements by leveraging the blockchain architecture and program properties of a blockchain network.

In particular embodiments, a program may be designed to handle an arbitrary number of certificates for an arbitrary number of programs of arbitrary sizes. Rather than deploying multiple instances of the program, just one instance may be sufficient. This instance may create and process accounts provided by users as input.

Tiered Certificate Authority Systems for Blockchain Smart Contracts

In particular embodiments, a blockchain cybersecurity platform may utilize tiered certificate authority systems to issue certificates for blockchain smart contracts. The blockchain cybersecurity platform may authorize one or more root authority entities (multiple root certificate authorities may coexist in the platform, and each can authorize an arbitrary number of certificate authorities), which in turn may create certificate authorities authorized to issue certificates. Based on the setup of a development environment agreed by both users (e.g., a person or an entity involved with developing the blockchain smart contract) and certificate authorities, the certificate authorities may audit smart contracts and issue certificates accordingly. In particular embodiments, every root certificate authority can revoke certificate authorities it created and the certificates its certificate authorities issued. A root authority entity may have the ability to both manually and automatically revoke certificates and certificate authorities. Although this disclosure describes using particular certificate authority systems to issue particular certificates in a particular manner, this disclosure contemplates using any suitable certificate authority system to issue any suitable certificate in any suitable manner.

In particular embodiments, the blockchain cybersecurity platform may identify, by a first root authority entity of one or more root authority entities associated with the blockchain cybersecurity platform, a plurality of first entities associated with the one or more root authority entities. In particular embodiments, the blockchain cybersecurity platform may authorize, by the first root authority entity, from the plurality of first entities, one or more first entities to be certificate authorities. Each certificate authority may be configured to audit a smart contract in a development environment before the smart contract is deployed on a first blockchain network. Each certificate authority may be authorized to issue, for each smart contract audited by the certificate authority in the development environment, a certificate for the smart contract based on a determination that the corresponding smart contract deployed on the first blockchain network matches the smart contract that was audited in the development environment. In particular embodiments, the blockchain cybersecurity platform may then determine, by the first root authority entity, for at least a first certificate authority authorized by the first root authority entity, that one or more certificate authority authorization parameters are not satisfied. The blockchain cybersecurity platform may further revoke, by the first root authority entity, the certificate authority authorization for the first certificate authority. In particular embodiments, each certificate issued by the first certificate authority prior to the revocation may remain valid after the revocation of the certificate authority authorization.

In particular embodiments, custom account types of the certificate system may comprise "root-authority-entity," "certificate-authority," and "certificate." The root-authority-entity account may be the foundation of a certificate system. This may be the only account allowed to create and revoke any and all certificate-authority accounts and revoke certificates issued in a particular certificate system. While this may increase the centralization of certificate systems, the probability of compromising a certificate authority may be greater or equal to the probability of compromising a root certificate authority, because of the significance of the certificate system in the blockchain ecosystem, the blockchain ecosystem may benefit from granting root certificate authorities certificate revocation privileges to protect users from the negative effects of actions of rogue certificate authorities. The account address of the root authority entity may be a program derived address (PDA) derived from the provided 32-byte seed and a static seed. It may store the authority wallet address and the number of certificate authorities created in the certificate system. As an example and not by way of limitation, the pseudo code defining the root certificate authority account structure may be:

```
#[account]
#[derive (Debug, Default)]
pub struct RootCertificateAuthority {
    pub authority: Pubkey,
    pub ca_account: u32
}
```

In particular embodiments, the cybersecurity authentication platform may create a plurality of certificate systems. A certificate system may begin with a first root authority entity. In particular embodiments, the certificate authority may be authorized to issue certificates by a first root authority entity associated with the certificate authority. As an example and not by way of limitation, the pseudo code defining the functions to create root certificate authorities and certificate authorities may be:

```
pub fn init_root_ca (
    ctx: Context<InitRootCertificateAuthority>,
    identifier: [u8; 32]
) -> Result <( )>{
    init_root_ca_handler (ctx, identifier)
}
pub fn init_ca (
    ctx: Context<InitCertificateAuthority>,
    ca_authority: Pubkey,
    expiry_slot: u64
) -> Result <(>{
    init_ca_handler (ctx, ca_authority, expiry_slot)
}
```

In particular embodiments, the one or more certificate authorities may be authorized to issue and reissue certificates in the development environment. A certificate authority may only issue and reissue certificates in the certificate system where it is authorized by the first root authority entity. As a result, the embodiments disclosed herein may have a technical advantage of improved security for certificating smart contracts. On account creation, the first root authority entity may set an expiry slot at which the certificate authority cannot issue or reissue certificates anymore. The account address of the certificate authority may be a program derived address (PDA) derived from the root-authority-entity account address, current number of certificate authorities in this certificate system, and a static seed. In particular embodiments, the first root authority entity may be associated with an account address storing one or more of an authority wallet address or a number of certificate authorities. As an example and not by way of limitation, the account address may store one or more of an authority wallet address, a slot at which the account expires, or a root-authority-entity account address. As an example and not by way of limitation, the pseudo code defining the certificate authority account structure may be:

```
#[account]
#[derive (Debug, Default)]
pub struct CertificateAuthority {
    pub authority: Pubkey,
    pub expiry_slot: Slot,
    pub root_ca: Pubkey
}
```

In particular embodiments, the certificate accounts may be created by certificate authorities. A certificate may store all data required to verify if the deployed program matches the exact version the certificate authorities were asked to review. Certificates may be reissued for upgradeable programs. Certificates may expire automatically if the program was modified after the certificate was issued. In particular embodiments, certificates may be issued only if the hash of the deployed program matches the hash provided by the certificate authority. The certificate account address may be a program derived address (PDA) derived from the program ID/address, the root-authority-entity account address and a static seed. As an example and not by way of limitation, the certificate account may store one or more of audited program address, audited program hash, audited program size, slot at which the certificate was issued, certificate status, program upgrade authority, certificate edition, an address of an account that stores additional data about a certified program or the audit report, or root-authority-entity account address. In particular embodiments, the certificate may indicate an account that is allowed to upgrade the program. The entity associated with the account may be able to upgrade the program anytime. As an example and not by way of limitation, the entity may upgrade the program in case the program is compromised. As an example and not by way of limitation, the pseudo code defining the certificate account structure may be:

```
#[account]
#[derive (Debug, Default)]
pub struct Certificate {
    pub program_id: Pubkey,
    pub program_hash: Hash,
    pub program_size: u64,
    pub issue_slot: Slot,
    pub status: CertificateStatus,
    pub program_upgrade_authority: Option<Pubkey>,
    pub edition: Option<u16>,
    pub root_ca: Pubkey,
    pub report: Option<Pubkey>
}
```

In particular embodiments, the specified development environment may be agreed upon based on a toolchain associated with the first blockchain network. The toolchain may allow for standardizing a plurality of smart contracts. In particular embodiments, a toolchain associated with a blockchain network may be supported on multiple operating systems. The same source code compiled on different operating systems may result in a different output binary, even if the toolchain versions match. To verifiably eliminate any and all discrepancies between the certificate authority's and user's development environment setups, the parties may agree on a mutual development environment for building the program prior to starting the certification process. The user may use this environment to build the program for production and the certificate authority may use this environment to build the program for the purposes of the certification process, otherwise the certification process may fail. As an example and not by way of limitation, a shared development environment may be based on a virtual machine or a docker container.

In particular embodiments, a certificate may be issued by a certificate authority only. Each certificate account may be tied to the first root authority entity the certificate authority is a child of. If the program is deployed and the copy of the program received by the certificate authority matches the deployed copy, the certificate authority may issue a certificate that is cryptographically and mathematically tied to the deployed program. As an example and not by way of limitation, the pseudo code defining the certificate account structure may be:

```
pub fn issue_certificate (
    ctx: Context<IssueCertificate>,
    program_hash: Hash,
```

```
    program_size: u64,
    report: Option<Pubkey>
) -> Result <( )>{
    issue_certificate_handler (ctx, program_hash, pro-
       gram_size, report)
}
```

To revoke certificate-authority accounts, the certificate authority authorization parameters may be checked. As an example and not by way of limitation, the one or more certificate authority authorization parameters for the first certificate authority may comprise a number of certificates issued by the first certificate authority. The one or more certificate authority authorization parameters for the first certificate authority may further comprise a specified period of time associated with the number of certificates issued by the first certificate authority. As another example and not by way of limitation, the one or more certificate authority authorization parameters for the first certificate authority may comprise a status of the association between the first root authority entity and the first certificate authority. In particular embodiments, determining that the one or more certificate authority authorization parameters are not satisfied for the first certificate authority may be based at least in part on a determination that the status of the association between the first root authority entity and the first certificate authority is invalid. As yet another example and not by way of limitation, the one or more certificate authority authorization parameters for the first certificate authority may comprise an authorization time indicating when the first certificate authority was authorized to be a certificate authority. In particular embodiments, determining that the one or more certificate authority authorization parameters are not satisfied for the first certificate authority may be based at least in part on a determination that a threshold time has elapsed since the authorization time. As an example and not by way of limitation, the pseudo code defining the function to revoke a certificate authority may be:

```
pub fn revoke_ca (
    ctx: Context<RevokeCertificateAuthority>,
) -> Result <( )>{
    Ok (( )
}
```

In particular embodiments, determining that the certificate authority authorization parameters are not satisfied for the first certificate authority may be based at least in part on an automatic recurring validation process associated with one or more of the certificate authorities. In particular embodiments, determining that the certificate authority authorization parameters are not satisfied for the first certificate authority may be based at least in part on an automatic determination that a value for at least one of the certificate authority authorization parameters exceeds a threshold value. In particular embodiments, determining that the certificate authority authorization parameters are not satisfied for the first certificate authority may be based at least in part on receiving, from an external entity associated with the first smart contract, a request to revoke the certificate authority authorization for the first certificate authority. In particular embodiments, determining that the certificate authority authorization parameters are not satisfied for the first certificate authority may be based at least in part on a recurring validation process associated with one or more of the certificate authorities conducted by one or more second entities associated with the first root authority entity. Revoking the certification authority authorization upon determining the certificate authority authorization parameters for the certificate authority are not satisfied may be an effective solution for addressing the technical challenge of effectively maintaining the certification authority authorization of a certificate authority by a first root authority entity as these parameters evaluate different perspectives of the certificate authority being suitable for issuing certificates for smart contracts.

In particular embodiments, root authority entities and certificate authorities may be created and maintained by all sorts of testing/reviewing/auditing organizations. A certificate may be the proof of successful completion of functional, financial or compliance reviews. A program certificate may be a proof the exact version of the program the users are interacting with was reviewed and approved by some organization. The users may then make an informed decision based on the reputation of the reviewing organization.

FIG. 1 illustrates an example method 100 for implementing tiered certificate authority systems. The method may begin at step 110, where the blockchain cybersecurity platform may identify, by a first root authority entity of one or more root authority entities associated with the blockchain cybersecurity platform, a plurality of first entities associated with the first root authority entity, wherein the first root authority entity is the blockchain cybersecurity platform, and wherein the first root authority entity is associated with an account address storing one or more of an authority wallet address or a number of certificate authorities. At step 120, the blockchain cybersecurity platform may authorize, by the first root authority entity, from the plurality of first entities, one or more first entities to be certificate authorities, wherein each certificate authority is configured to audit a smart contract in a development environment before the smart contract is deployed on a first blockchain network, and wherein each certificate authority is authorized to issue, for each smart contract audited by the certificate authority in the development environment, a certificate for the smart contract based on a determination that the corresponding smart contract deployed on the first blockchain network matches the smart contract that was audited in the development environment, wherein the one or more certificate authorities are authorized to issue and reissue certificates in the development environment, wherein each issued certificate comprises data associated with the first root authority entity that issued the certificate, wherein each issued certificate is written to the first blockchain network, wherein each issued certificate comprises data configured for public queries, and wherein each issued certificate comprises one or more of an identifier associated with the corresponding smart contract, a hash associated with the corresponding smart contract, a size associated with the corresponding smart contract, a time slot at which the certificate was issued, a status of the certificate, an upgrade authority for the corresponding smart contract, a certificate edition, an address of an account that stores additional data about the certified smart contract or an audit report associated with the corresponding smart contract, or an account address associated with the first root authority entity. At step 130, the blockchain cybersecurity platform may determine, by the first root authority entity, for at least a first certificate authority authorized by the first root authority entity, that one or more certificate authority authorization parameters are not satisfied, wherein determining that the certificate authority authorization parameters are not satisfied for the first certificate authority is based on one or more of an automatic recurring validation process associated with one or more of the certificate authorities, an automatic determination that a value for at least one of the certificate authority authorization parameters exceeds a threshold value, receiving, from an external entity associated with the first smart contract, a request to revoke the certificate authority authorization for the first certificate authority, a recurring validation process associated with one or more of the certificate authorities conducted by one or more second entities associated with the first root authority entity, a specified period of time associated with a number of certificates issued by the first certificate authority when the one or more certificate authority authorization parameters for the first certificate authority comprise the number of certificates issued by the first certificate authority, a determination that a status of the association between the first root authority entity and the first certificate authority is invalid when the one or more certificate authority authorization parameters for the first certificate authority comprise the status of the association between the first root authority entity and the first certificate authority, or a determination that a threshold time has elapsed since an authorization time when the one or more certificate authority authorization parameters for the first certificate authority comprise the authorization time indicating when the first certificate authority was authorized to be a certificate authority. At step 140, the blockchain cybersecurity platform may revoke, by the first root authority entity, the certificate authority authorization for the first certificate authority, wherein each certificate issued by the first certificate authority prior to the revocation remains valid after the revocation of the certificate authority authorization. Particular embodiments may repeat one or more steps of the method of FIG. 1, where appropriate. Although this disclosure describes and illustrates particular steps of the method of FIG. 1 as occurring in a particular order, this disclosure contemplates any suitable steps of the method of FIG. 1 occurring in any suitable order. Moreover, although this disclosure describes and illustrates an example method for tiered certificate authority systems including the particular steps of the method of FIG. 1, this disclosure contemplates any suitable method for tiered certificate authority systems including any suitable steps, which may include all, some, or none of the steps of the method of FIG. 1, where appropriate. Furthermore, although this disclosure describes and illustrates particular components, devices, or systems carrying out particular steps of the method of FIG. 1, this disclosure contemplates any suitable combination of any suitable components, devices, or systems carrying out any suitable steps of the method of FIG. 1.

Post-Audit Certificate Issuance for Deployed Blockchain Smart Contracts

In particular embodiments, the blockchain cybersecurity platform may issue certificates for deployed blockchain smart contracts upon completing the audit successfully. The blockchain cybersecurity platform may issue certificates in the context of the following auditing process, including certificate authorities receiving a copy of the smart contract source code, certificate authorities sharing the audit results with the development team, development team addressing all findings, certificate authorities reviewing the changes the development team made, certificate authorities and the development team publishing the audit report, after which the smart contract may be deployed on the network. Although this disclosure describes issuing particular certificates based on particular auditing processes in a particular manner, this disclosure contemplates issuing any suitable certificate based on any suitable auditing process in any suitable manner.

In particular embodiments, the blockchain cybersecurity platform may receive, by a certificate authority, authorization to access a specified development environment associated with a smart contract. The blockchain cybersecurity platform may then receive, by the certificate authority, in the development environment, a first copy of source code associated with the smart contract. In particular embodiments, the certificate authority may be authorized to audit the smart contract. The blockchain cybersecurity platform may then generate, by the certificate authority, an audit report for the smart contract based on the first copy of source code and one or more security criteria. In particular embodiments, the blockchain cybersecurity platform may further receive, by the certificate authority, in the development environment, a second copy of source code associated with the smart contract. The second copy of source code may be generated responsive to the audit report. In particular embodiments, the blockchain cybersecurity platform may then determine, by the certificate authority, that the second copy of source code satisfies the one or more security criteria. The blockchain cybersecurity platform may then receive, by the certificate authority, an indication that the smart contract was deployed on a first blockchain network. In particular embodiments, the blockchain cybersecurity platform may determine, by the certificate authority, that the smart contract deployed on the first blockchain network matches the second copy of source code in the development environment. The blockchain cybersecurity platform may further issue, by the certificate authority, a certificate for the smart contract based on the determination that the smart contract deployed on the first blockchain network matches the second copy of source code.

In particular embodiments, the blockchain cybersecurity platform may determine, by the certificate authority, that the first copy of source code does not satisfy the one or more security criteria. In this case, for each of a plurality of iterations until the certificate authority determines that the most recent copy of source code satisfies the one or more security criteria, the blockchain cybersecurity platform may perform the following steps. The blockchain cybersecurity platform may generate, by the certificate authority, an updated audit report. The blockchain cybersecurity platform may then transmit, by the certificate authority, the updated audit report to an entity associated with the smart contract. The blockchain cybersecurity platform may then receive, by the certificate authority, in the development environment, from the entity, an updated copy of source code associated with the smart contract. The blockchain cybersecurity platform may further determine, by the certificate authority, whether the updated copy of source code satisfies the one or more security criteria.

In particular embodiments, the blockchain cybersecurity platform may determine, by the certificate authority, that the smart contract deployed on the first blockchain network does not match the second copy of source code. In this case, for each of a plurality of iterations until the certificate authority determines that an updated smart contract deployed on the first blockchain network matches a second updated copy of source code associated with the smart contract, the blockchain cybersecurity platform may perform the following steps. The blockchain cybersecurity platform may transmit, by the certificate authority, to an entity associated with the smart contract, a notification that a certificate was not issued for the smart contract. The blockchain cybersecurity platform may then receive, by the certificate authority in the development environment, a first updated copy of source code associated with an updated smart contract. The blockchain cybersecurity platform may then generate, by the certificate authority, an updated audit report for the smart contract based on the first updated copy of source code. The blockchain cybersecurity platform may then receive, by the certificate authority, in the development environment, a second updated copy of source code associated with the updated smart contract. In particular embodiments, the second updated copy of source code may be generated responsive to the updated audit report. The blockchain cybersecurity platform may then determine, by the certificate authority, that the second updated copy of source code satisfies the one or more security criteria. The blockchain cybersecurity platform may then receive, by the certificate authority, an indication that the updated smart contract was deployed on the first blockchain network. The blockchain cybersecurity platform may then determine, by the certificate authority, that the updated smart contract deployed on the first blockchain network matches the second updated copy of source code in the development environment. The blockchain cybersecurity platform may further issue, by the certificate authority, a certificate for the updated smart contract based on the determination that the updated smart contract deployed on the first blockchain network matches the second updated copy of source code.

FIG. 2 illustrates an example flow diagram 200 for issuing a certificate. At step 205, a root authority entity may be created. In particular embodiments, the first root authority entity may be the blockchain cybersecurity platform. In particular embodiments, there may be only one root authority entity for each auditing organization. At step 210, the root authority entity may create a certificate authority. In particular embodiments, the root authority entity may create an arbitrary number of certificate authorities. Step 205 and step 210 may be both within the setup stage for the certificate system.

At step 215, the certificate authority and user may agree on a common build environment, i.e., a specified development environment. In particular embodiments, the specified development environment may be a development environment agreed upon by an entity associated with the smart contract and the certificate authority for auditing the smart contract. At step 220, the certificate authority may receive a copy of the program to audit and detailed instructions on how to build it. At step 225, the certificate authority may audit the program and report the audit results to the user. At step 230, the user may address the reported items. In particular embodiments, the second copy of source code associated with the smart contract may be generated based on the audit report by an entity associated with the smart contract. At step 235, the certificate system may determine whether the patches are verified by the certificate authority. If they are not verified, the flow diagram 200 may return to step 220 to repeat step 220 through step 235. If the patches are verified, the program may be deployed at step 240. In other words, the smart contract may be deployed on the first blockchain network responsive to the determination that the second copy of source code satisfies the one or more security criteria.

At step 245, the certificate may be processed. In particular embodiments, the determination that the smart contract deployed on the first blockchain network matches the second copy of source code may be based on one or more of a hash associated with the smart contract or a timestamp associated with the smart contract. If the hash or timestamp mismatch, the flow diagram 200 may return to step 220 and repeat step 220 through step 245. If the hash and timestamp match, the certificate may be issued at step 250. In particular embodiments, each issued certificate may comprise data associated with the root authority entity that issued the certificate. Each issued certificate may also comprise data associated with the certificate authority that issued the certificate. Each issued certificate may also comprise data configured for public queries. In addition, each issued certificate may comprise one or more of an address associated with the corresponding smart contract, a hash associated with the corresponding smart contract, a size associated with the corresponding smart contract, a time slot at which the certificate was issued, a status of the certificate, an upgrade authority for the corresponding smart contract, a certificate edition, an address of an account that stores additional data about a certified smart contract or an audit report associated with the corresponding smart contract, or an account address associated with the root authority entity. In particular embodiments, each issued certificate may be written to the first blockchain network. Step 215 through step 250 may be within the certificate issue stage. In particular embodiments, generating the audit report for the first copy of source code and determining that the second copy of source code satisfies the one or more security criteria may be performed by the certificate authority off-chain from the first blockchain network. Determining if the deployed smart contract matches its audited copy based on the hash and/or timestamp of associated with the smart contract may be an effective solution for addressing the technical challenge of determining a deployed smart contract matches its audited copy as the hash and/or timestamp may indicate whether there is any change between the deployed smart contract matches its audited copy.

As a result, the embodiments disclosed herein may have a technical advantage of preventing or mitigating security risks for smart contracts as the certificate authorities may test and review the source code, research the technology and find bugs and vulnerabilities in smart contracts before they are deployed to the blockchain networks.

Figure 3:
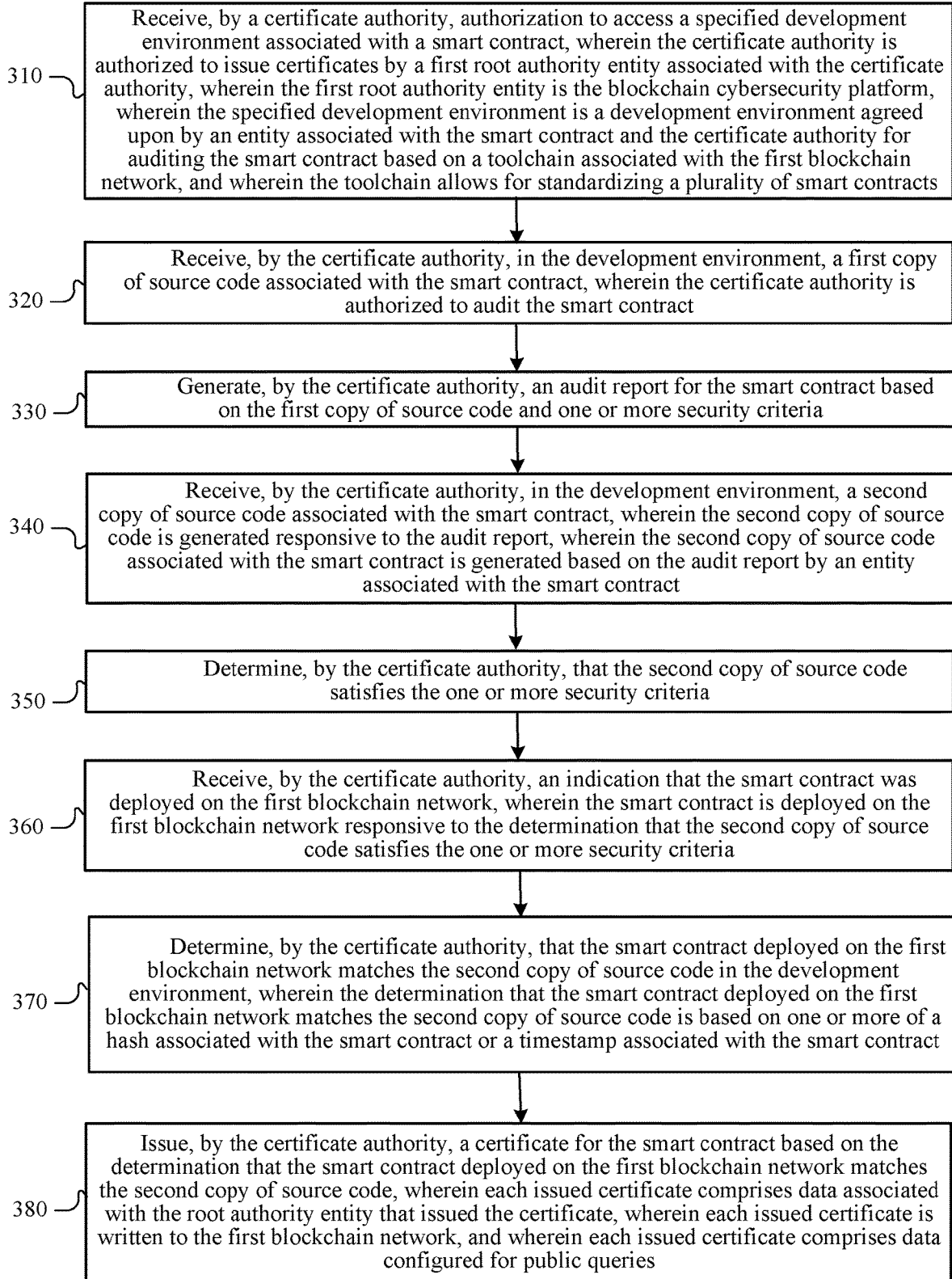
FIG. 3 illustrates an example method for post-audit certificate issuance.

FIG. 3 illustrates an example method 300 for post-audit certificate issuance. The method may begin at step 310, where the blockchain cybersecurity platform may receive, by a certificate authority, authorization to access a specified development environment associated with a smart contract, wherein the certificate authority is authorized to issue certificates by a first root authority entity associated with the certificate authority, wherein the first root authority entity is the blockchain cybersecurity platform, wherein the specified development environment is a development environment agreed upon by an entity associated with the smart contract and the certificate authority for auditing the smart contract based on a toolchain associated with the first blockchain network, and wherein the toolchain allows for standardizing a plurality of smart contracts. At step 320, the blockchain cybersecurity platform may receive, by the certificate authority, in the development environment, a first copy of source code associated with the smart contract, wherein the certificate authority is authorized to audit the smart contract. At step 330, the blockchain cybersecurity platform may generate, by the certificate authority, an audit report for the smart contract based on the first copy of source code and one or more security criteria. At step 340, the blockchain cybersecurity platform may receive, by the certificate authority, in the development environment, a second copy of source code associated with the smart contract, wherein the second copy of source code is generated responsive to the audit report, wherein the second copy of source code associated with the smart contract is generated based on the audit report by an entity associated with the smart contract. At step 350, the blockchain cybersecurity platform may determine, by the certificate authority, that the second copy of source code satisfies the one or more security criteria. At step 360, the blockchain cybersecurity platform may receive, by the certificate authority, an indication that the smart contract was deployed on the first blockchain network, wherein the smart contract is deployed on the first blockchain network responsive to the determination that the second copy of source code satisfies the one or more security criteria. At step 370, the blockchain cybersecurity platform may determine, by the certificate authority, that the smart contract deployed on the first blockchain network matches the second copy of source code in the development environment, wherein the determination that the smart contract deployed on the first blockchain network matches the second copy of source code is based on one or more of a hash associated with the smart contract or a timestamp associated with the smart contract. At step 380, the blockchain cybersecurity platform may issue, by the certificate authority, a certificate for the smart contract based on the determination that the smart contract deployed on the first blockchain network matches the second copy of source code, wherein each issued certificate comprises data associated with the root authority entity that issued the certificate, wherein each issued certificate is written to the first blockchain network, and wherein each issued certificate comprises data configured for public queries. Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for post-audit certificate issuance including the particular steps of the method of FIG. 3, this disclosure contemplates any suitable method for post-audit certificate issuance including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

On-Chain Certificate Verification for Interrelated Blockchain Smart Contracts

In particular embodiments, the blockchain cybersecurity platform may perform on-chain certificate verification for interrelated blockchain smart contracts. Upon receiving a verification request for a certificate, the blockchain cybersecurity platform may determine whether a certificate account exists for a pair of a smart contract address and a root authority entity address, determine whether the smart contract is upgradeable, and determine whether the smart contract was modified after the certificate was issued. In particular embodiments, a first blockchain program may verify the certificate for a second blockchain program. Although this disclosure describes verifying particular certificates by particular systems in a particular manner, this disclosure contemplates verifying any suitable certificate by any suitable system in any suitable manner.

As an example and not by way of limitation, the pseudo code defining the function to check a certificate may be:
pub fn check_certificate (
  ctx: Context<CheckCertificate>,
) -> Result <( )>{
  check_certificate_handler (ctx)
}
In particular embodiments, the blockchain cybersecurity platform may send, by a first smart contract deployed on a first blockchain network by a first entity, a verification request for a certificate issued by a certificate authority. The certificate may be associated with a second smart contract. In particular embodiments, the verification request may comprise a program address associated with the second smart contract and an address associated with a first root authority entity associated with the certificate authority. In particular embodiments, the blockchain cybersecurity platform may receive, by the first smart contract, a verification response indicating that the second smart contract is associated with a certificate matching the program address associated with the second smart contract and the address associated with the first root authority entity in the verification request. The blockchain cybersecurity platform may then determine, by the first smart contract, whether the second smart contract is an upgradeable smart contract. In particular embodiments, the blockchain cybersecurity platform may further determine, by the first smart contract, whether the certificate is valid based on a determination of whether the second smart contract was modified after the certificate was issued.

Figure 4:
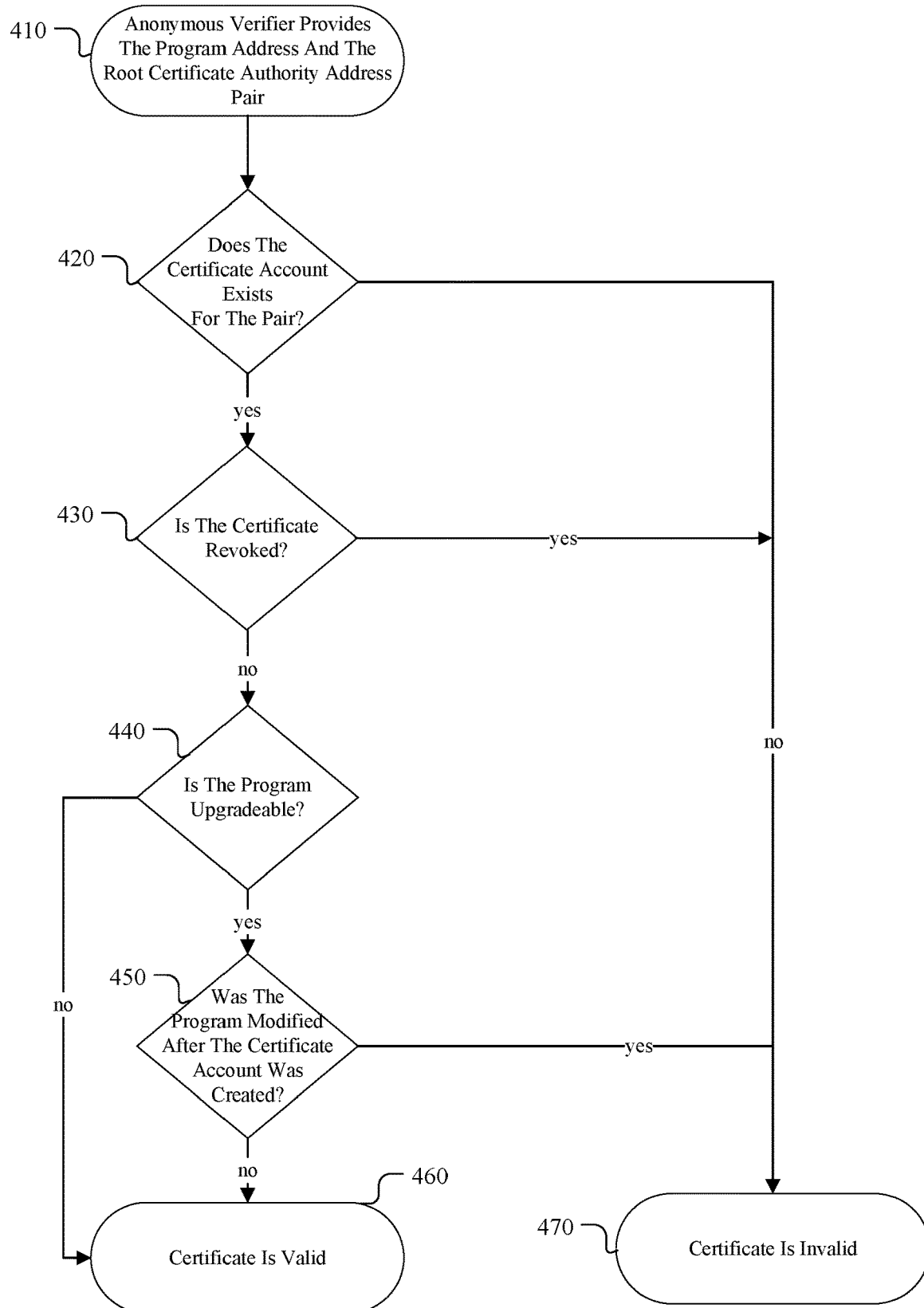
FIG. 4 illustrates an example flow diagram for verifying certificates on-chain.

FIG. 4 illustrates an example flow diagram 400 for verifying certificates on-chain. In particular embodiments, a user may check if a particular program was certified by a particular certificate authority. In particular embodiments, the certificate authority that issued the certificate may be authorized to audit and issue certificates for a plurality of smart contracts. The user may provide the identifier of the certificate authority and the address to the program. At step 410, an anonymous verifier may provide the program address and the root authority entity address. In particular embodiments, a first smart contract may check if a second contract was certified. The second smart contract may be deployed on the first blockchain network, and the certificate for the second smart contract may be written to the first blockchain network. In particular embodiments, the second smart contract may be associated with a plurality of certificates issued by a plurality of certificate authorities associated with a respective plurality of root authority entities. The plurality of root authority entities may be associated with a plurality of addresses, respectively. In particular embodiments, the plurality of addresses may comprise the address in the verification request.

At step 420, the certificate system may check if the certificate exists for the pair. If the certificate exists, the certificate system may check if the certificate is revoked at step 430. If the certificate is not revoked, the certificate system may check if the certified program is upgradable at step 440. In particular embodiments, the second smart contract may be determined to be an upgradeable contract based on the verification response. If the certified program is upgradable, the certificate system may check whether the program was modified after the certificate account was created at step 450. In particular embodiments, determining whether the second smart contract was modified after the certificate was issued may comprise the following steps. The blockchain cybersecurity platform may firstly identify, by the first smart contract, a first timestamp indicating when the certificate was issued and a second timestamp indicating when the second smart contract was last deployed. The blockchain cybersecurity platform may then compare, by the first smart contract, the first timestamp and the second timestamp. As an example and not by way of limitation, the certificate system may determine if the timestamp at which the program was last modified is older than the timestamp at which certificate was issued. If the program was not modified after the certificate account was created (e.g., the timestamp at which the program was last modified is older than the timestamp at which certificate was issued), the verification may pass and the certificate system may determine that the certificate is valid at step 460. If the program was modified after the certificate account was created, the certificate may be invalid at step 470.

In particular embodiments, the certificate may comprise a program-upgrade-authority identifier identifying an entity that is permitted to modify the second smart contract. The second smart contract may be determined to have been modified after the certificate was issued.

If the certified program is not upgradable as determined at step 440, that means the certificate is implicitly valid, which proceeds also to step 460. In particular embodiments, the blockchain cybersecurity platform may determine that the second smart contract is not an upgradeable smart contract. The blockchain cybersecurity platform may further determine that the certificate must be valid based on the determination that the second smart contract is not an upgradeable smart contract.

In particular embodiments, determining whether the certificate associated with the second smart contract is valid may comprise the following steps. The blockchain cybersecurity platform may send, by the first smart contract, to a third smart contract, the verification request for the certificate. The blockchain cybersecurity platform may further receive, by the first smart contract, from the third smart contract, a verification response comprising the determination of whether the second smart contract was modified after the certificate was issued.

If the certificate account does not exist for the pair as determined at step 420, or if the certificate is revoked as determined at step 430, or if the program was modified after the certificate account was created at step 450, the certificate system may determine that the certificate is invalid at step 470. Determining whether a certificate account exists for a pair of the program identifier and the root authority entity address, whether said certificate is revoked and determining whether the smart contract was modified after the certificate account was created may be an effective solution for addressing the technical challenge of efficiently and effectively verifying the certificate for a smart contract as the system may have high confidence that the certificate is invalid if the certificate account does not exist, it is revoked or the smart contract was modified after the certificate account was created.

In particular embodiments, the verification process may be done both on chain and off chain. As an example and not by way of limitation, determining whether the certificate associated with the second smart contract is valid may be an on-chain action on the first blockchain network. As another example and not by way of limitation, determining whether the certificate associated with the second smart contract is valid may be an off-chain action external to the first blockchain network. As a result, the verification process may be integrated with any program that is deployed on the chain.

In particular embodiments, there may be an interface that allows for querying the certificate system with the address of the program being verified and the address of the root authority entity. A user may get a response from the certificate program if the data the user provided corresponds to a valid certificate and a valid certified program. In particular embodiments, determining whether the certificate associated with the second smart contract is valid may further comprise the following steps. In particular embodiments, the blockchain cybersecurity platform may input, by the first smart contract, via an interface associated with a root authority entity, a query comprising data associated with the certificate. The blockchain cybersecurity platform may then receive, by the first smart contract, via the interface, a query response indicating whether the certificate is valid.

In particular embodiments, a certificate may expire only if it was issued for an upgradeable program and the program was updated after the certificate was issued. In particular embodiments, the second smart contract may be determined to be an upgradeable contract. Correspondingly, the certificate may comprise an iteration field indicating a number of versions of source code associated with the second smart contract. In this case, determining whether the certificate is valid may be further based on the iteration field.

In particular embodiments, the user may request a reaudit of the program from any certificate authority in the certificate system the certificate was originally issued in. In particular embodiments, a certificate authority may reissue a certificate for a program at the same address. The reissued certificate may have all the metadata that the original certificate had. The difference may include the edition changes of the certificate, e.g., a field called edition field indicating the iteration of the certificate and the address of the account authorized to upgrade the program if the program is upgradeable and if the program upgrade authority was changed.

In particular embodiments, a certificate may be verified anonymously. For upgradeable programs, a certificate may be valid only if its issue slot (i.e., timestamp at which the certificate was issued) is greater than the most recent slot the program was modified at and the certificate is not revoked. For final programs, if a certificate account exists for the given pair of program address and root-certificate-authority address and it is not revoked, the certificate may be valid. As a result, the embodiments disclosed herein may have a technical advantage of improved user confidence as after a user verifies a certificate, the user may determine that it is secured to execute the program associated with the certificate as one or more certificate authorities have already verified the program.

Figure 5:
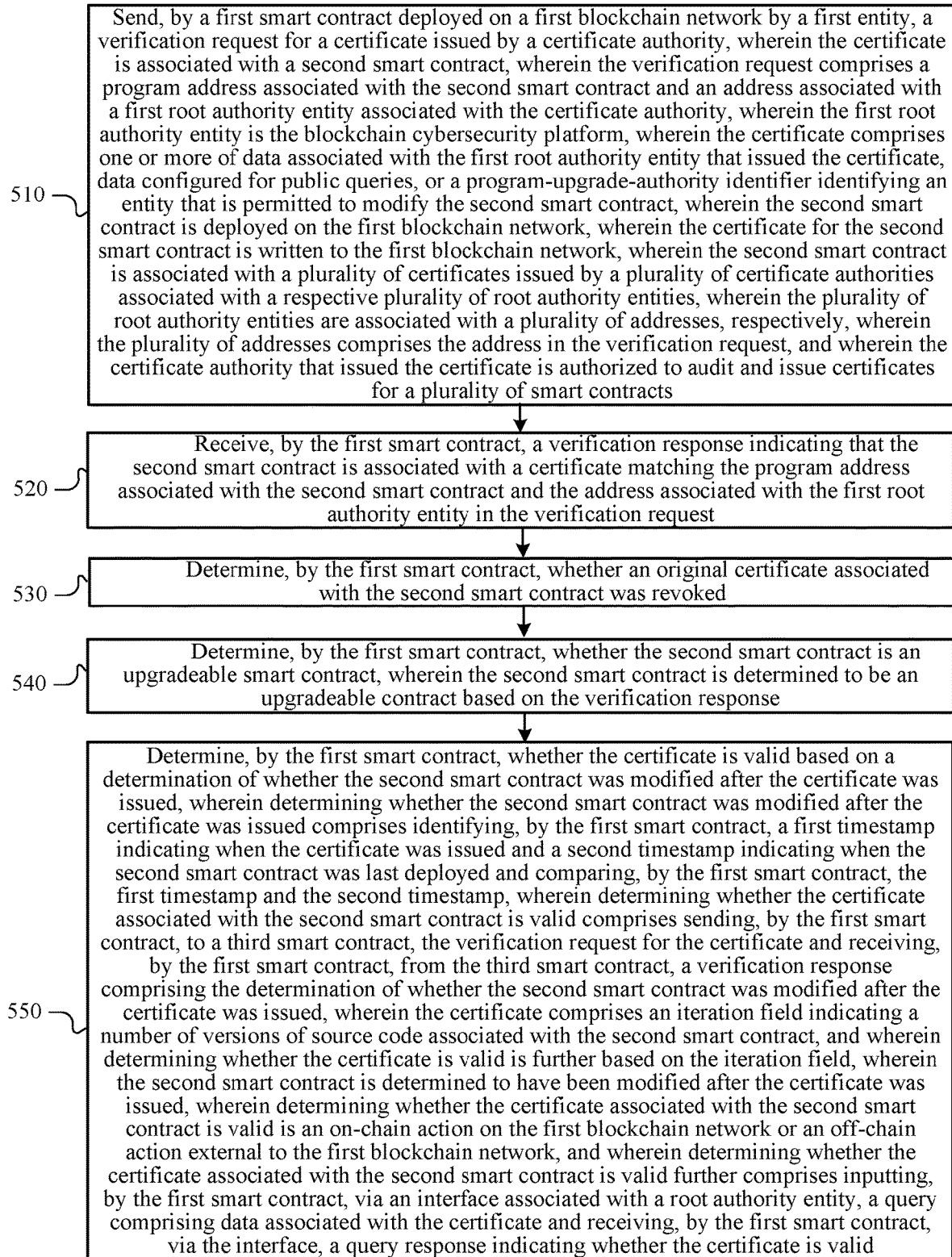
FIG. 5 illustrates an example method for certificate verification for smart contracts.

FIG. 5 illustrates an example method 500 for certificate verification for smart contracts. The method may begin at step 510, where the blockchain cybersecurity platform may send, by a first smart contract deployed on a first blockchain network by a first entity, a verification request for a certificate issued by a certificate authority, wherein the certificate is associated with a second smart contract, wherein the verification request comprises a program address associated with the second smart contract and an address associated with a first root authority entity associated with the certificate authority, wherein the first root authority entity is the blockchain cybersecurity platform, wherein the certificate comprises one or more of data associated with the first root authority entity that issued the certificate, data configured for public queries, or a program-upgrade-authority identifier identifying an entity that is permitted to modify the second smart contract, wherein the second smart contract is deployed on the first blockchain network, wherein the certificate for the second smart contract is written to the first blockchain network, wherein the second smart contract is associated with a plurality of certificates issued by a plurality of certificate authorities associated with a respective plurality of root authority entities, wherein the plurality of root authority entities are associated with a plurality of addresses, respectively, wherein the plurality of addresses comprises the address in the verification request, and wherein the certificate authority that issued the certificate is authorized to audit and issue certificates for a plurality of smart contracts. At step 520, the blockchain cybersecurity platform may receive, by the first smart contract, a verification response indicating that the second smart contract is associated with a certificate matching the program address associated with the second smart contract and the address associated with the first root authority entity in the verification request. At step 530, the blockchain cybersecurity platform may determine, by the first smart contract, whether an original certificate associated with the second smart contract was revoked. At step 540, the blockchain cybersecurity platform may determine, by the first smart contract, whether the second smart contract is an upgradeable smart contract, wherein the second smart contract is determined to be an upgradeable contract based on the verification response. At step 550, the blockchain cybersecurity platform may determine, by the first smart contract, whether the certificate is valid based on a determination of whether the second smart contract was modified after the certificate was issued, wherein determining whether the second smart contract was modified after the certificate was issued comprises identifying, by the first smart contract, a first timestamp indicating when the certificate was issued and a second timestamp indicating when the second smart contract was last deployed and comparing, by the first smart contract, the first timestamp and the second timestamp, wherein determining whether the certificate associated with the second smart contract is valid comprises sending, by the first smart contract, to a third smart contract, the verification request for the certificate and receiving, by the first smart contract, from the third smart contract, a verification response comprising the determination of whether the second smart contract was modified after the certificate was issued, wherein the certificate comprises an iteration field indicating a number of versions of source code associated with the second smart contract, and wherein determining whether the certificate is valid is further based on the iteration field, wherein the second smart contract is determined to have been modified after the certificate was issued, wherein determining whether the certificate associated with the second smart contract is valid is an on-chain action on the first blockchain network or an off-chain action external to the first blockchain network, and wherein determining whether the certificate associated with the second smart contract is valid further comprises inputting, by the first smart contract, via an interface associated with a root authority entity, a query comprising data associated with the certificate and receiving, by the first smart contract, via the interface, a query response indicating whether the certificate is valid. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for certificate verification for smart contracts including the particular steps of the method of FIG. 5, this disclosure contemplates any suitable method for certificate verification for smart contracts including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Certificate Reissuance for Upgraded Blockchain Smart Contracts

In particular embodiments, the blockchain cybersecurity platform may reissue certificates for upgraded blockchain smart contracts or when the original certificates were revoked. Compared to the initial certificate issuance, the blockchain cybersecurity platform may perform additional decisional checks for upgradeable smart contracts, including the initial check for whether the program is upgradeable, and the subsequent determination of whether the program has actually been upgraded based on, for example, temporal comparisons between the existing certificate's issuance and the most recent deployment of the program, or whether the original certificate was revoked. Although this disclosure describes reissuing particular certificates based on particular auditing processes in a particular manner, this disclosure contemplates reissuing any suitable certificate based on any suitable auditing process in any suitable manner.

In particular embodiments, the blockchain cybersecurity platform may receive, by a certificate authority, a request to reissue a certificate for a smart contract on a first blockchain network. In particular embodiments, an original certificate may be previously issued for the smart contract. The blockchain cybersecurity platform may then determine, by the certificate authority, that the smart contract is an upgradeable smart contract and that the smart contract was modified after the original certificate was issued, or that the original certificate was revoked. In particular embodiments, the blockchain cybersecurity platform may receive, by the certificate authority, in a development environment, a copy of updated source code associated with an updated version of the smart contract. The blockchain cybersecurity platform may then determine, by the certificate authority, whether the copy of updated source code satisfies one or more security criteria. In particular embodiments, the blockchain cybersecurity platform may receive, by the certificate authority, an indication that the updated smart contract was deployed on the first blockchain network. The blockchain cybersecurity platform may then determine, by the certificate authority, that the updated smart contract deployed on the first blockchain network matches the copy of updated source code in the development environment. The blockchain cybersecurity platform may further issue, by the certificate authority, a reissue certificate for the updated smart contract based on the determination that the updated smart contract deployed on the first blockchain network matches the updated source code.

As an example and not by way of limitation, the pseudo code defining the function to reissue a certificate may be:

```
pub fn reissue_certificate (
    ctx: Context<ReissueCertificate>,
    program_hash: Hash,
    program_size: u64,
    report: Option<Pubkey>
) -> Result <( )>{
    reissue_certificate_handler (ctx, program_hash, program_size, report)
}
```

In particular embodiments, the original certificate and reissue certificate for the smart contract may comprise data associated with the first root authority entity. The original certificate and reissue certificate for the smart contract may also comprise data configured for public queries. In particular embodiments, the original certificate and reissue certificate for the smart contract may be written to the first blockchain network.

In particular embodiments, determining that the smart contract was modified after the original certificate was issued may comprise the following steps. The blockchain cybersecurity platform may identify, by the first smart contract, a first timestamp indicating when the certificate was issued. The blockchain cybersecurity platform may then identify a second timestamp indicating when the second smart contract was last modified deployed. The blockchain cybersecurity platform may further compare, by the first smart contract, the first timestamp to the second timestamp. Determining whether the smart contract is upgradeable and whether it was modified after a certificate was issued for the smart contract may be an effective solution for addressing the technical challenge of determining that a certificate should be reissued for a smart contract as an upgradeable contract may be modified, and a modification to the smart contract makes it necessary for the certificate to be reissued.

Figure 6:
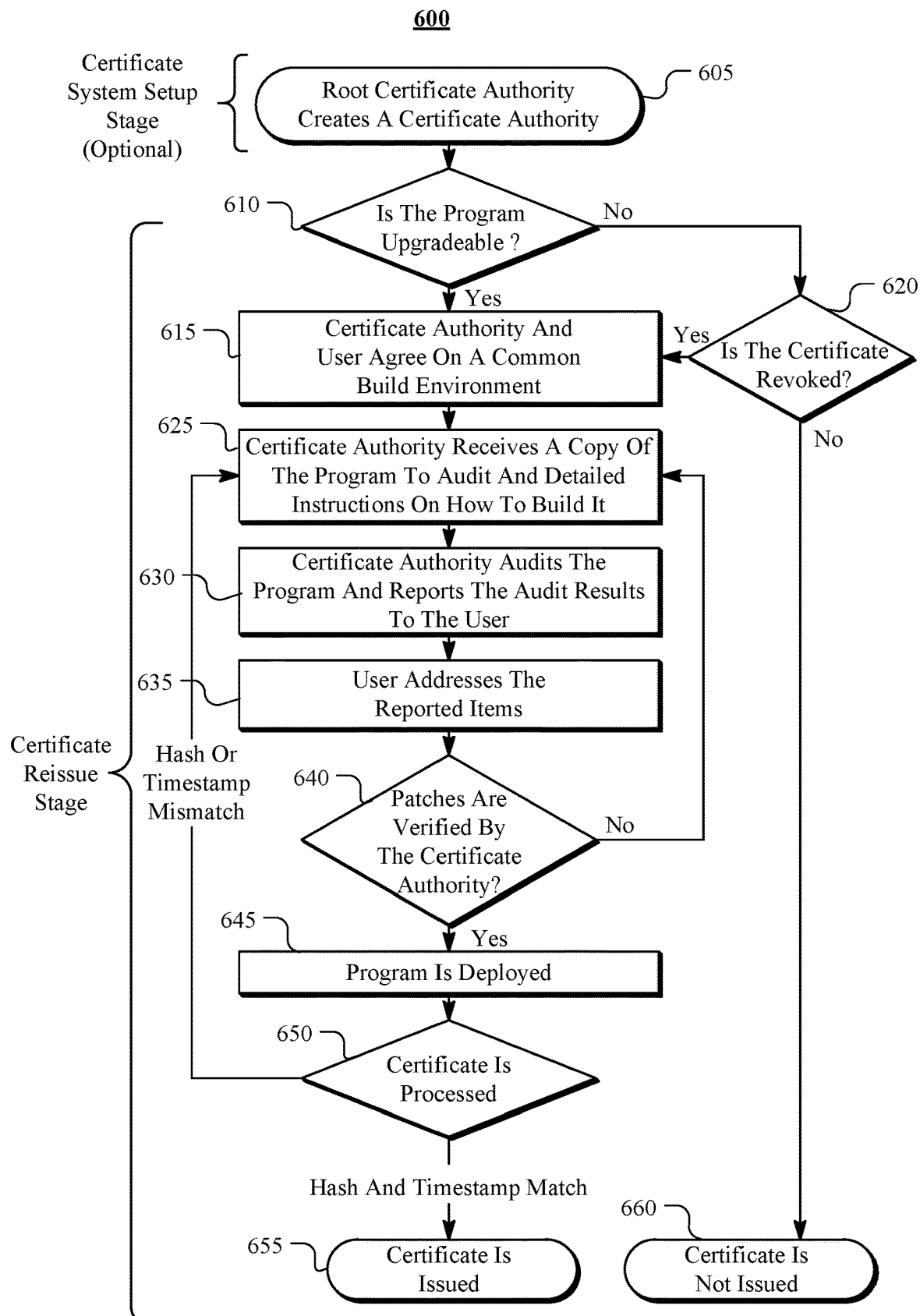
FIG. 6 illustrates an example flow diagram for reissuing a certificate.

FIG. 6 illustrates an example flow diagram 600 for reissuing a certificate. At step 605, the root certificate authority may create a certificate authority. This step may be the setup stage for the certificate system, which may be optional. At step 610, the certificate system may determine if the program is upgradeable. If the program is upgradeable, the certificate authority and user may agree on a common build environment at step 615. If the program is not upgradeable, the certificate system may determine whether the certificate is revoked at step 620. If the certificate is revoked, the flow diagram 600 may proceed to step 615.

At step 625, the certificate authority may receive a copy of the program to audit and detailed instructions on how to build it. At step 630, the certificate authority may audit the program and report the audit results to the user. At step 635, the user may address the reported items. At step 640, the certificate system may determine whether the patches are verified by the certificate authority. In particular embodiments, determining whether the copy of updated source code satisfies the one or more security criteria may be performed by the certificate authority off-chain from the first blockchain network. If they are not verified, the flow diagram 600 may return to step 625 to repeat step 625 through step 640. If the patches are verified, the program may be deployed at step 645. In other words, the smart contract may be deployed on the first blockchain network responsive to the determination that the updated source code satisfies the one or more security criteria.

In particular embodiments, determining, by the certificate authority, whether the updated source code satisfies the one or more security criteria may comprise the following steps. For each of a plurality of iterations until the certificate authority determines that the most recent copy of updated source code satisfies the one or more security criteria, the blockchain cybersecurity platform may generate, by the certificate authority, an audit report. The blockchain cybersecurity platform may then transmit, by the certificate authority, the auditing report to an entity associated with the smart contract. The blockchain cybersecurity platform may then receive, by the certificate authority in the development environment from the entity, an updated copy of source code associated with the smart contract. The blockchain cybersecurity platform may further determine, by the certificate authority, whether the updated copy of source code satisfies the one or more security criteria. In particular embodiments, the updated copy of source code associated with the smart contract may be generated based on the determination that the smart contract was modified after the original certificate was issued.

At step 650, the certificate may be processed. In particular embodiments, the determination that the updated smart contract deployed on the first blockchain network matches the updated source code may be based on one or more of a hash associated with the smart contract or a timestamp associated with the smart contract.

If the hash or timestamp mismatch, the flow diagram 600 may return to step 625 and repeat step 625 through step 650. In particular embodiments, the blockchain cybersecurity platform may determine, by the certificate authority, that the updated smart contract deployed on the first blockchain network does not match the updated copy of source code. For each of a plurality of iterations until the certificate authority determines that an updated smart contract deployed on the first blockchain network matches an updated copy of source code associated with the smart contract, the blockchain cybersecurity platform may transmit, by the certificate authority, to an entity associated with the smart contract, a notification that a certificate was not reissued for the upgraded smart contract. The blockchain cybersecurity platform may then receive, by the certificate authority in the development environment, a first updated copy of source code associated with an updated smart contract. The blockchain cybersecurity platform may then generate, by the certificate authority, an updated audit report for the smart contract based on the first updated copy of source code. The blockchain cybersecurity platform may then receive, by the certificate authority, in the development environment, a second updated copy of source code associated with the updated smart contract. In particular embodiments, the second updated copy of source code may be generated responsive to the updated audit report. The blockchain cybersecurity platform may then determine, by the certificate authority, that the second updated copy of source code satisfies the one or more security criteria. The blockchain cybersecurity platform may then receive, by the certificate authority, an indication that the updated smart contract was deployed on the first blockchain network. The blockchain cybersecurity platform may then determine, by the certificate authority, that the updated smart contract deployed on the first blockchain network matches the second updated copy of source code in the development environment. The blockchain cybersecurity platform may further issue, by the certificate authority, a reissue certificate for the updated smart contract based on the determination that the updated smart contract deployed on the first blockchain network matches the second updated copy of source code.

If the hash and timestamp match, the certificate may be reissued at step 655. If the certificate is not revoked as determined at step 620, the certificate may be not reissued at step 660. Step 610 through step 660 may be within the certificate reissue stage.

As a result, the embodiments disclosed herein may have a technical advantage of consistently efficient certification processes as the certificate authority may easily re-audit the smart contract in the development environment familiar to both the user and certificate authorities and re-issue a certificate to the smart contract upon successfully completing the audit following the same criteria.

Figure 7:
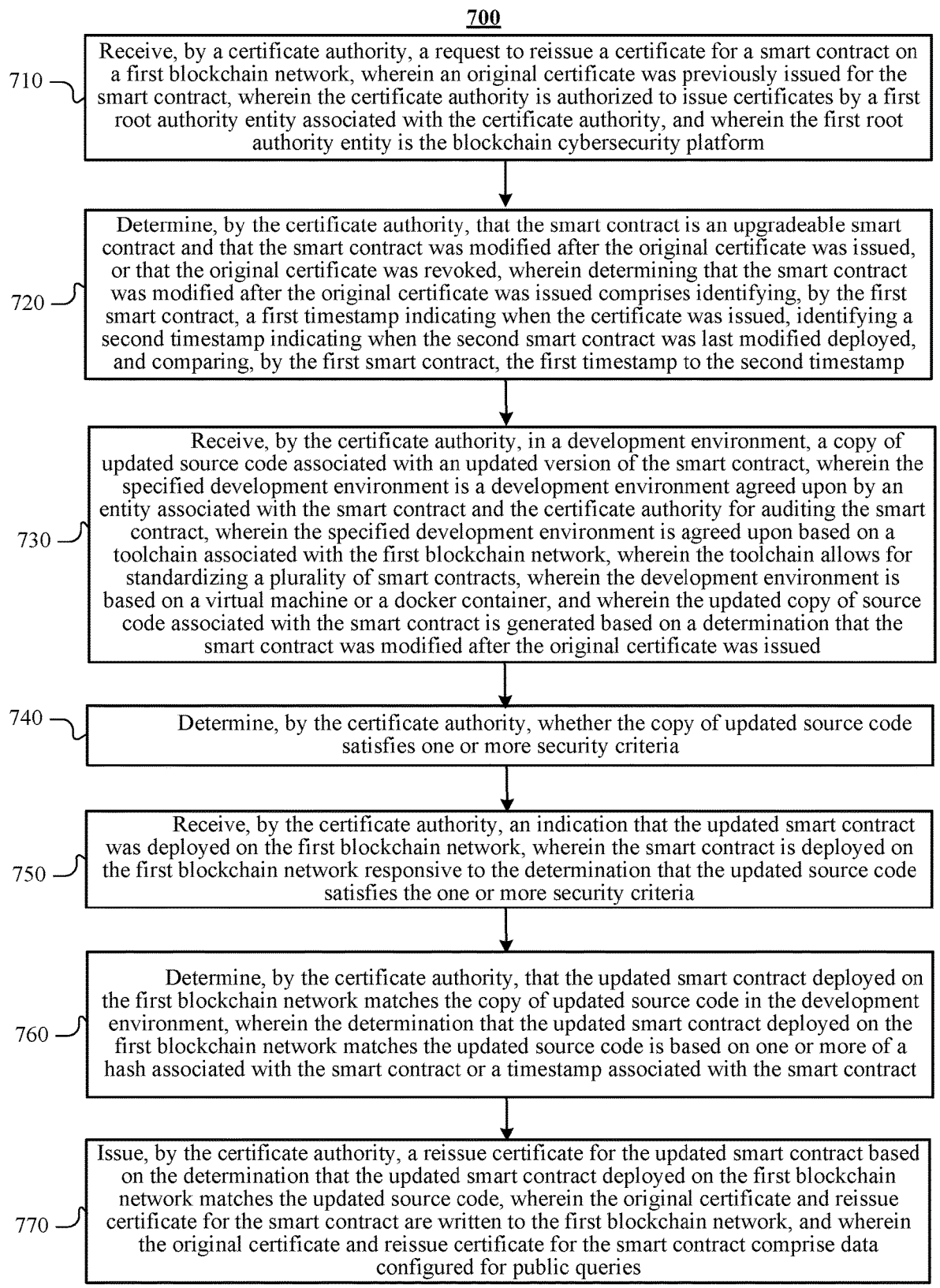
FIG. 7 illustrates an example method for certificate reissuance for smart contracts.

FIG. 7 illustrates an example method 700 for certificate reissuance for smart contracts. The method may begin at step 710, where the blockchain cybersecurity platform may receive, by a certificate authority, a request to reissue a certificate for a smart contract on a first blockchain network, wherein an original certificate was previously issued for the smart contract, wherein the certificate authority is authorized to issue certificates by a first root authority entity associated with the certificate authority, and wherein the first root authority entity is the blockchain cybersecurity platform. At step 720, the blockchain cybersecurity platform may determine, by the certificate authority, that the smart contract is an upgradeable smart contract and that the smart contract was modified after the original certificate was issued, or that the original certificate was revoked, wherein determining that the smart contract was modified after the original certificate was issued comprises identifying, by the first smart contract, a first timestamp indicating when the certificate was issued, identifying a second timestamp indicating when the second smart contract was last modified deployed, and comparing, by the first smart contract, the first timestamp to the second timestamp. At step 730, the blockchain cybersecurity platform may receive, by the certificate authority, in a development environment, a copy of updated source code associated with an updated version of the smart contract, wherein the specified development environment is a development environment agreed upon by an entity associated with the smart contract and the certificate authority for auditing the smart contract, wherein the specified development environment is agreed upon based on a toolchain associated with the first blockchain network, wherein the toolchain allows for standardizing a plurality of smart contracts, wherein the development environment is based on a virtual machine or a docker container, and wherein the updated copy of source code associated with the smart contract is generated based on a determination that the smart contract was modified after the original certificate was issued. At step 740, the blockchain cybersecurity platform may determine, by the certificate authority, whether the copy of updated source code satisfies one or more security criteria. At step 750, the blockchain cybersecurity platform may receive, by the certificate authority, an indication that the updated smart contract was deployed on the first blockchain network, wherein the smart contract is deployed on the first blockchain network responsive to the determination that the updated source code satisfies the one or more security criteria. At step 760, the blockchain cybersecurity platform may determine, by the certificate authority, that the updated smart contract deployed on the first blockchain network matches the copy of updated source code in the development environment, wherein the determination that the updated smart contract deployed on the first blockchain network matches the updated source code is based on one or more of a hash associated with the smart contract or a timestamp associated with the smart contract. At step 770, the blockchain cybersecurity platform may issue, by the certificate authority, a reissue certificate for the updated smart contract based on the determination that the updated smart contract deployed on the first blockchain network matches the updated source code, wherein the original certificate and reissue certificate for the smart contract are written to the first blockchain network, and wherein the original certificate and reissue certificate for the smart contract comprise data configured for public queries. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for certificate reissuance for smart contracts including the particular steps of the method of FIG. 7, this disclosure contemplates any suitable method for certificate reissuance for smart contracts including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Systems and Methods

Figure 8:
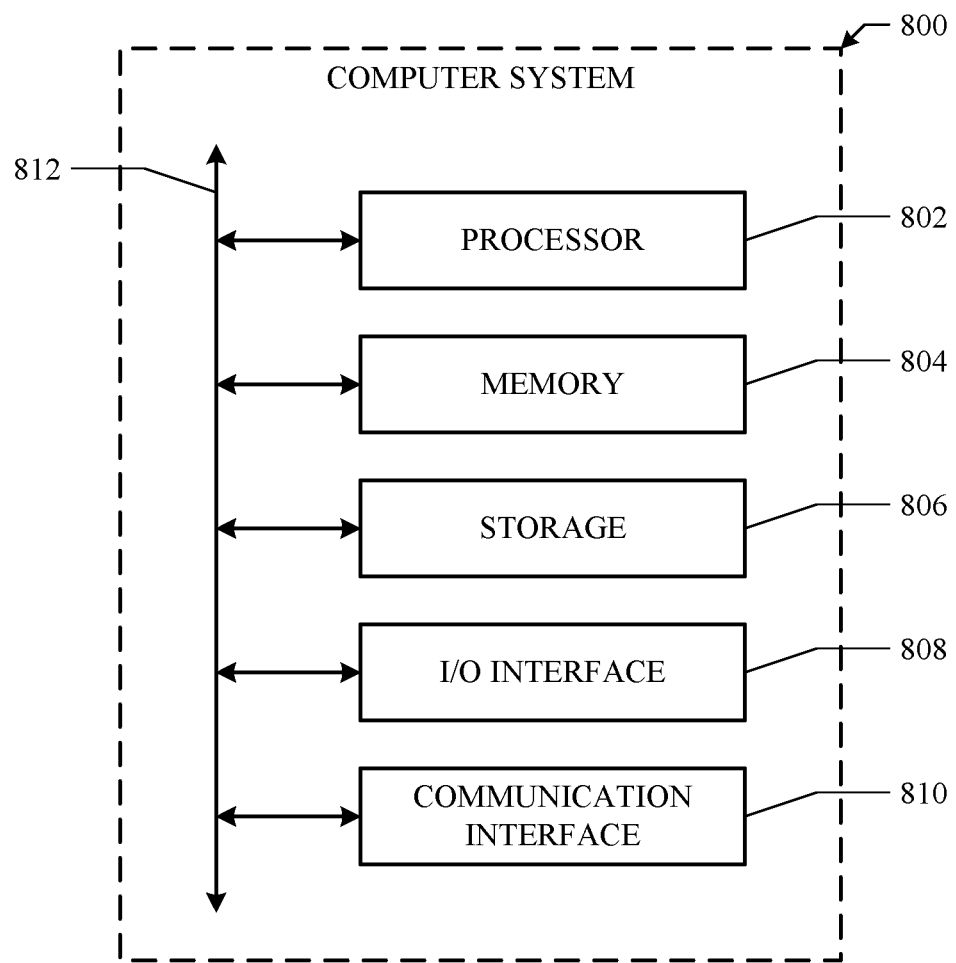
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

MISCELLANEOUS

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more servers associated with a blockchain cybersecurity platform:
    identifying, by a first root authority entity of one or more root authority entities associated with the blockchain cybersecurity platform, a plurality of first entities associated with the one or more root authority entities;
    authorizing, by the first root authority entity, from the plurality of first entities, one or more first entities to be certificate authorities, wherein each certificate authority is configured to audit a smart contract in a development environment before the smart contract is deployed on a first blockchain network, and wherein each certificate authority is authorized to issue, for each smart contract audited by the certificate authority in the development environment, a certificate for the smart contract based on a determination that the corresponding smart contract deployed on the first blockchain network matches the smart contract that was audited in the development environment;
    determining, by the first root authority entity, for at least a first certificate authority authorized by the first root authority entity, that one or more certificate authority authorization parameters are not satisfied; and
    revoking, by the first root authority entity, the certificate authority authorization for the first certificate authority, wherein each certificate issued by the first certificate authority prior to the revocation remains valid after the revocation of the certificate authority authorization.

2. The method of claim 1, wherein the first root authority entity is the blockchain cybersecurity platform.

3. The method of claim 1, wherein each issued certificate comprises data associated with the first root authority entity that issued the certificate.

4. The method of claim 1, wherein each issued certificate is written to the first blockchain network.

5. The method of claim 1, wherein each issued certificate comprises data configured for public queries.

6. The method of claim 1, wherein each issued certificate comprises one or more of:
    an address associated with the corresponding smart contract;
    a hash associated with the corresponding smart contract;
    a size associated with the corresponding smart contract;
    a time slot at which the certificate was issued;
    a status of the certificate;
    an upgrade authority for the corresponding smart contract;
    a certificate edition;
    an address of an account that stores additional data about the certified smart contract or an audit report associated with the corresponding smart contract; or
    an account address associated with the first root authority entity.

7. The method of claim 1, wherein determining that the certificate authority authorization parameters are not satisfied for the first certificate authority is based at least in part on an automatic recurring validation process associated with one or more of the certificate authorities.

8. The method of claim 1, wherein determining that the certificate authority authorization parameters are not satisfied for the first certificate authority is based at least in part on an automatic determination that a value for at least one of the certificate authority authorization parameters exceeds a threshold value.

9. The method of claim 1, wherein determining that the certificate authority authorization parameters are not satisfied for the first certificate authority is based at least in part on receiving, from an external entity associated with the first smart contract, a request to revoke the certificate authority authorization for the first certificate authority.

10. The method of claim 1, wherein determining that the certificate authority authorization parameters are not satisfied for the first certificate authority is based at least in part on a recurring validation process associated with one or more of the certificate authorities conducted by one or more second entities associated with the first root authority entity.

11. The method of claim 1, wherein the one or more certificate authority authorization parameters for the first certificate authority comprise a number of certificates issued by the first certificate authority.

12. The method of claim 11, wherein the one or more certificate authority authorization parameters for the first certificate authority further comprise a specified period of time associated with the number of certificates issued by the first certificate authority.

13. The method of claim 1, wherein the one or more certificate authority authorization parameters for the first certificate authority comprise a status of the association between the first root authority entity and the first certificate authority.

14. The method of claim 13, wherein determining that the one or more certificate authority authorization parameters are not satisfied for the first certificate authority is based at least in part on a determination that the status of the association between the first root authority entity and the first certificate authority is invalid.

15. The method of claim 1, wherein the one or more certificate authority authorization parameters for the first certificate authority comprise an authorization time indicating when the first certificate authority was authorized to be a certificate authority.

16. The method of claim 15, wherein determining that the one or more certificate authority authorization parameters are not satisfied for the first certificate authority is based at least in part on a determination that a threshold time has elapsed since the authorization time.

17. The method of claim 1, wherein the first root authority entity is associated with an account address storing one or more of an authority wallet address or a number of certificate authorities.

18. The method of claim 1, wherein the one or more certificate authorities are authorized to issue and reissue certificates in the development environment.

19. One or more computer-readable non-transitory storage media embodying software that is operable when executed to:
identify, by a first root authority entity of one or more root authority entities associated with a blockchain cybersecurity platform, a plurality of first entities associated with the one or more root authority entities;
authorize, by the first root authority entity, from the plurality of first entities, one or more first entities to be certificate authorities, wherein each certificate authority is configured to audit a smart contract in a development environment before the smart contract is deployed on a first blockchain network, and wherein each certificate authority is authorized to issue, for each smart contract audited by the certificate authority in the development environment, a certificate for the smart contract based on a determination that the corresponding smart contract deployed on the first blockchain network matches the smart contract that was audited in the development environment;
determine, by the first root authority entity, for at least a first certificate authority authorized by the first root authority entity, that one or more certificate authority authorization parameters are not satisfied; and
revoke, by the first root authority entity, the certificate authority authorization for the first certificate authority, wherein each certificate issued by the first certificate authority prior to the revocation remains valid after the revocation of the certificate authority authorization.

20. A computing system comprising: one or more processors; and a non-transitory memory coupled to the processors comprising instructions executable by the processors, the processors operable when executing the instructions to:
identify, by a first root authority entity of one or more root authority entities associated with a blockchain cybersecurity platform, a plurality of first entities associated with the one or more root authority entities;
authorize, by the first root authority entity, from the plurality of first entities, one or more first entities to be certificate authorities, wherein each certificate authority is configured to audit a smart contract in a development environment before the smart contract is deployed on a first blockchain network, and wherein each certificate authority is authorized to issue, for each smart contract audited by the certificate authority in the development environment, a certificate for the smart contract based on a determination that the corresponding smart contract deployed on the first blockchain network matches the smart contract that was audited in the development environment;
determine, by the first root authority entity, for at least a first certificate authority authorized by the first root authority entity, that one or more certificate authority authorization parameters are not satisfied; and
revoke, by the first root authority entity, the certificate authority authorization for the first certificate authority, wherein each certificate issued by the first certificate authority prior to the revocation remains valid after the revocation of the certificate authority authorization.

\* \* \* \* \*